United States Patent [19]
Kondo et al.

[11] Patent Number: 5,488,618
[45] Date of Patent: Jan. 30, 1996

[54] ERROR DETECTING APPARATUS

[75] Inventors: Tetsujiro Kondo; Hideo Nakaya, both of Kanagawa, Japan

[73] Assignee: Sony Corporation, Tokyo, Japan

[21] Appl. No.: 263,527

[22] Filed: Jun. 22, 1994

[30] Foreign Application Priority Data

Jun. 29, 1993 [JP] Japan .................... 5-184435

[51] Int. Cl.⁶ .................................... G06F 7/02
[52] U.S. Cl. ........................... 371/67.1; 371/48
[58] Field of Search ................ 371/25.1, 24, 67.1, 371/71, 48; 364/265, 265.1, 266.2; 395/575

[56] References Cited

U.S. PATENT DOCUMENTS

| | | | |
|---|---|---|---|
| 4,581,741 | 4/1986 | Huffman et al. | 371/67.1 |
| 5,305,468 | 4/1994 | Bruckert et al. | 455/69 |
| 5,321,773 | 6/1994 | Kopec et al. | 382/30 |
| 5,329,538 | 7/1994 | Kawano et al. | 371/57.2 |

FOREIGN PATENT DOCUMENTS

| | | |
|---|---|---|
| 63-98577 | 4/1988 | Japan . |
| 4208706 | 7/1992 | Japan . |

OTHER PUBLICATIONS

A. Mahmood "An Improved Iterative Design For Powers of Two Coefficient FIR Filters" 1991 IEEE pp. 375–378.

Primary Examiner—Robert W. Beausoliel, Jr.
Assistant Examiner—Albert Decady
Attorney, Agent, or Firm—William S. Frommer; Alvin Sinderbrand

[57] ABSTRACT

A least square calculating circuit receives a plurality of past normal pixel data and class information. The calculating circuit predicts future pixel data corresponding to a linear coupling of the past pixel data and the coefficients for a class. At this time, the calculating circuit determines coefficients where the square of an error becomes minimum. The learnt coefficients are stored in a coefficient memory. An estimation value generating circuit generates an estimated value corresponding to the coefficients and the past pixel data. A subtracting circuit generates a difference value between the estimated value and the real value. The difference value is supplied to an error determining circuit. When the difference value largely deviates from the estimated value and when the number of such pixels that take place in a predetermined time period is larger than a predetermined threshold value, an error is detected.

6 Claims, 7 Drawing Sheets

Fig. 1

O : PIXELS USED FOR MODEL

◎ : PIXELS USED FOR MODEL AND CLASS CATEGORIZATION

X : ESTIMATED PIXEL

ERROR DETECTING APPARATUS

BACKGROUND OF THE INVENTION

1. Field of the Invention

The present invention relates to an error detecting apparatus for use with for example image information.

2. Description of the Related Art

In the following description, the present invention is applied to an image. However, it should be noted that the present invention can be applied to various kinds of information including images and sounds. In a conventional error detecting method, a pattern of an error is provided in advance. Here the wording "error" contains the error of quality of images or sounds, the error of objects in the image, and the error of sound sources. An input signal is compared with the pattern so as to determine whether or not the input signal has an error.

In the conventional error detecting method, since the number of error patterns that can be prepared in advance is limited, the error detecting accuracy is low.

An object of the present invention is to provide an error detecting apparatus with high error detecting accuracy.

SUMMARY OF THE INVENTION

The present invention is an error detecting apparatus for detecting an error of a present digital information signal corresponding to a predicted digital information signal formed by past data, comprising a coefficient outputting means for forming a class corresponding to a pattern of past data of a plurality of information data that has been prepared or that is being received and for outputting a coefficient determined by a method of least squares, class by class, a means for linear-coupling the past data and the coefficient so as to generate an estimated value of future data, a means for forming a difference value between the estimated value and a true value, and a determining means for comparing the estimated value with threshold values in two levels and for determining that the estimated value has an error if the difference value exceeds the threshold values.

Pixel data in past time and space sequence and a coefficient are linear-coupled so as to form an estimated value of a future pixel. Past data of a normal image are categorized as classes. A most suitable coefficient is pre-determined by a learning operation corresponding to method of least squares. An input image is learnt and categorized as a class at a time. With an acquired coefficient, an estimated value of a future pixel is generated. A difference value between the estimated value and a real value is calculated. The difference value is compared with a first threshold value. The number of difference values is compared with a second threshold value is counted in a predetermined time period. If the number of difference values is larger than the second threshold value, an error state is detected.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Next, an error detecting apparatus for image information according to an embodiment of the present invention will be described. For easy understanding of the present invention, with reference to FIG. 1, an image in a time and space model will be described.

Figure 1:
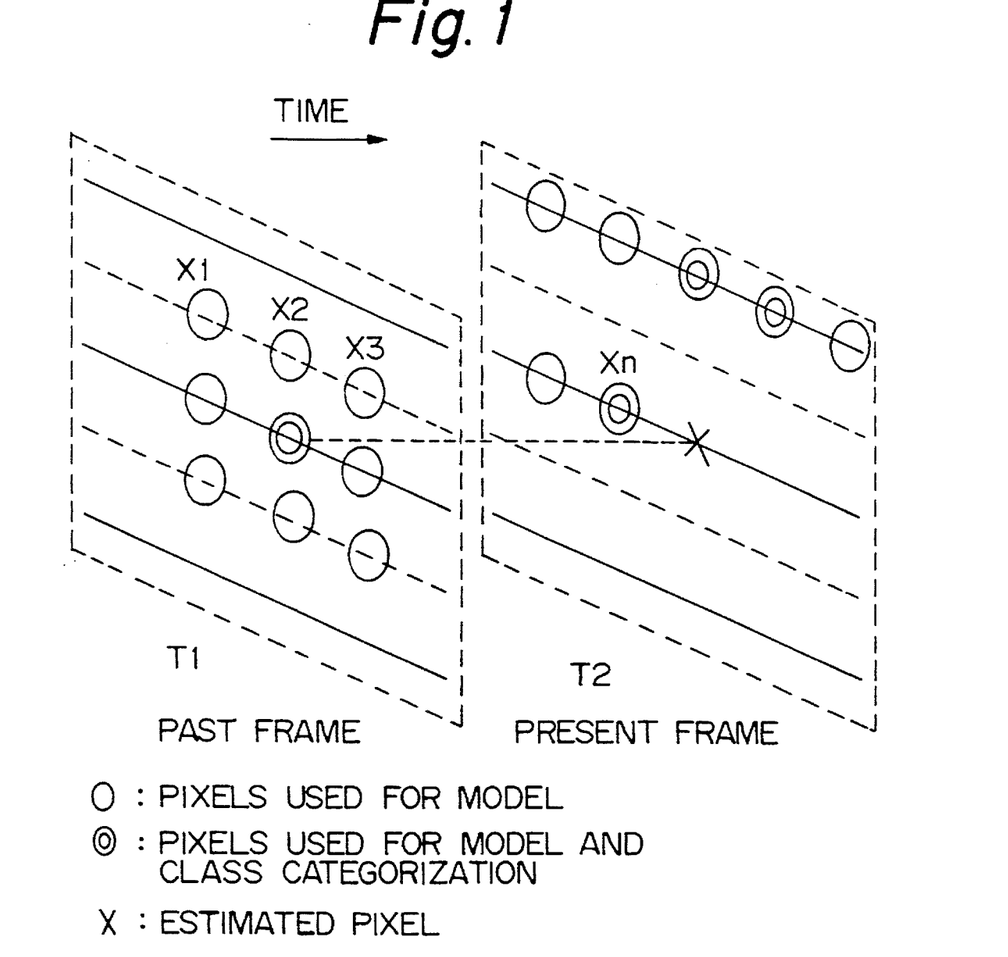
FIG. 1 is a schematic diagram for explaining a time and space model according to an embodiment of the present invention.

In FIG. 1, T1 and T2 represent two frames that take place in succession where T1 is a past frame and T2 is a present frame. In the drawing, pixels used for generating an estimated value and categorizing the estimated value as a class are shown. Future pixels in a present frame are represented by a linear coupling model with value $x_i$ and coefficient $w_i$ (where i=1, 2, ..., n). As will be described later, coefficients are determined by a method of least squares so that the square of an error of an estimated value y of a future pixel against a true value represented by a linear coupling model of value $x_i$ and coefficient $w_i$. A set of coefficients are obtained, frame by frame and class by class.

In the time and space model shown in FIG. 1, n is 16. A predicted value y of a future pixel of a present frame T2 is represented by a linear coupling expression of 16 taps of an input image $w_1x_1+w_2x_2+\ldots+w_{16}x_{16}$. The coefficient $w_i$ of the linear coupling model is selected so that the difference value between the real value and the estimated value represented by the linear coupling expression becomes minimum.

To determine the indeterminate coefficient $w_1$, a linear coupling expression is created in the following manner. Pixels of an input image shown in FIG. 1 that are moved in space direction (horizontal and vertical directions) are given as $x_i$ (i=1, ..., n). In addition, real values of predicted pixels are given as $y_j$ (where j=1, ..., m). With $x_i$ and $y_j$, the linear coupling expression can be created. If an input image is shifted pixel by pixel, a large number of simultaneous equations (referred to as observation equations) corresponding to the number of pixels of one frame are created. To determine 16 coefficients, at least 16 simultaneous equations are required. The number of equations, m, can be selected from view points of accuracy and process time. The observation equation is given as follows.

$$XW=Y \tag{1}$$

where X, W, and Y are for example the following matrixes.

$$X = \begin{pmatrix} x_{11} & x_{12} & \ldots & x_{1n} \\ x_{21} & x_{22} & \ldots & x_{2n} \\ \ldots & \ldots & \ldots & \ldots \\ x_{m1} & x_{m2} & \ldots & x_{mn} \end{pmatrix}, W = \begin{pmatrix} w_1 \\ w_2 \\ \ldots \\ w_n \end{pmatrix}, Y = \begin{pmatrix} y_1 \\ y_2 \\ \ldots \\ y_m \end{pmatrix} \quad (2)$$

The coefficient w is obtained by the method of least squares so that errors against real values are minimized. In other words, a residual matrix E is added to the right term of the observation equation so as to create the following residual equation. Thus, a coefficient matrix W is obtained so that the squares of elements of the residual matrix E of the residual equation, namely square errors, become minimum.

$$XW = Y + E, \; E = \begin{pmatrix} e_1 \\ e_2 \\ \ldots \\ e_m \end{pmatrix} \quad (3)$$

To obtain the most suitable value of each element $w_i$ of the coefficient matrix W corresponding to the residual equation (3), the following condition should be satisfied. In other words, the sum of squares of m difference values corresponding to pixels of the block should be minimized, This condition can be expressed by the following equation (4).

$$e_1 \frac{\partial e_1}{\partial w_i} + e_2 \frac{\partial e_2}{\partial w_i} + \ldots e_m \frac{\partial e_m}{\partial w_i} = 0 \; (i = 1, 2, \ldots, n) \quad (4)$$

By substituting n conditions into the equation (3), indeterminate coefficients $w_1, w_2, \ldots, w_n$ can be obtained. Thus, by the residual equation (3), the following equation (4) can be obtained.

$$\frac{\partial e_i}{\partial w_1} = x_{i1}, \frac{\partial e_i}{\partial w_2} = x_{i2}, \ldots, \frac{\partial e_i}{\partial w_n} = x_{im} \; (i = 1, 2, \ldots, n) \quad (5)$$

By applying the condition of the formula (4) for i (where i=1, 2, . . . , n), the equations (5) and (6) can be obtained.

$$\sum_{i=1}^{n} e_i x_{i1} = 0, \sum_{i=1}^{n} e_i x_{i2} = 0, \ldots, \sum_{i=1}^{n} e_i x_{im} = 0 \quad (6)$$

With the equations (3) and (6), the following normal equation can be obtained.

$$\begin{cases} \left(\sum_{j=1}^{m} x_{j1}x_{j1}\right) w_1 + \left(\sum_{j=1}^{m} x_{j1}x_{j2}\right) w_2 + \ldots + \left(\sum_{j=1}^{m} x_{j1}x_{jn}\right) w_n = \left(\sum_{j=1}^{m} x_{j1}y_j\right) \\ \left(\sum_{j=1}^{m} x_{j2}x_{j1}\right) w_1 + \left(\sum_{j=1}^{m} x_{j2}x_{j2}\right) w_2 + \ldots + \left(\sum_{j=1}^{m} x_{j2}x_{j2}\right) w_n = \left(\sum_{j=1}^{m} x_{j2}y_j\right) \\ \vdots \\ \left(\sum_{j=1}^{m} x_{jn}x_{j1}\right) w_1 + \left(\sum_{j=1}^{m} x_{jn}x_{j2}\right) w_2 + \ldots + \left(\sum_{j=1}^{m} x_{jn}x_{jn}\right) w_n = \left(\sum_{j=1}^{m} x_{jn}y_j\right) \end{cases} \quad (7)$$

The normal equation (7) is a simultaneous equation with n unknowns. Thus, with the normal equation (7), each indeterminate coefficient $w_i$, which are the most suitable values, can be obtained. In other words, when the matrix for $w_i$ in the formula (7) is regular, it can be solved. In reality, the indeterminate coefficient $w_i$ is obtained by Gauss-Jordan's elimination method (referred to as sweep-out method). Thus, one set of coefficients that represent future pixels for one frame are determined.

According to this embodiment, coefficients learnt and determined are used as predicted coefficients so as to predict future pixel data. In this case, input images are categorized as classes so as to improve estimation accuracy. In FIG. 1, pixels represented with "o" are used for a linear coupling model, whereas pixels represented with "⊙" are used for both a linear coupling model and a class categorization. In other words, four of 16 pixels are used for a class categorization.

When each of the four pixels is constructed of four bits, a large number of combinations thereof takes place ($2^{4 \times 4}$= 65536 cases). Thus, this class categorization is not practical. To reduce the number of combinations, as will be described later, bits of the four pixels are encoded and compressed. More specifically, by ADRC (Adaptive Dynamic Range Coding), each pixel is compressed to code constructed of one bit. Thus, the number of classes to be considered can be reduced to $2^4$=16. A code that represents a class is referred to as an index. In addition to ADRC, bits of each pixel can be reduced by vector quantization. Moreover, the most significant bit of each pixel may be used as an index. Four pixels adjacent to a predicted pixel are categorized as classes by four-bit code, each of which is constructed of one bit. In other words, class categorization is performed corresponding to pattern changes of successive images.

Figure 2:
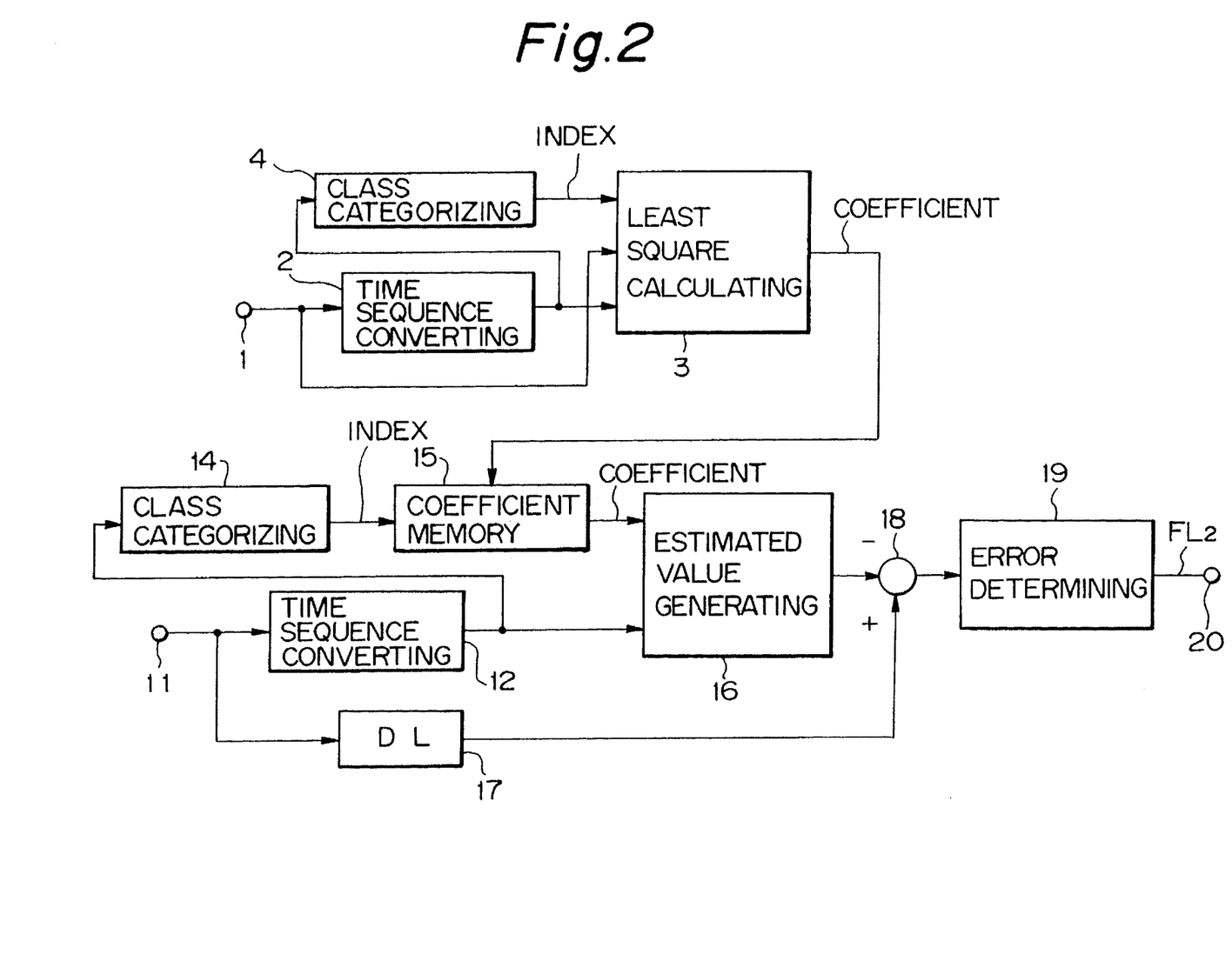
FIG. 2 is a block diagram showing an error detecting apparatus according to an embodiment of the present invention.

FIG. 2 is a block diagram showing an apparatus corresponding to an embodiment of the present invention. In this apparatus, classes and coefficients have been learnt and determined. With the determined coefficients, errors of input images are detected. First, the learning operation will be described. In FIG. 2, reference numeral 1 is an input terminal. Input image data is supplied to the input terminal 1. The input image data is preferably data with a normal pattern constructed of a large number of still images. The input image data is supplied to a time sequence converting circuit 2 and a least square calculating circuit 3. The time sequence converting circuit 2 converts input image data of raster scanning sequence into a plurality of image data of time sequence that are used for linear coupling model and class categorization.

Output data of the time sequence converting circuit 2 is supplied to the calculating circuit 3 and a class categorizing circuit 4. The class categorizing circuit 4 generates an index which indicates a class of an object pixel corresponding to three-dimensional changes of an image. The index is supplied to the calculating circuit 3. The calculating circuit 3 determines one set of coefficient $w_i$ for each class represented by the index with respect to the time and space model shown in FIG. 1 corresponding to the above-described algorithm of the method of last squares. The coefficients are stored in a coefficient memory 15. When normal input images of many frames are learnt, an average value of coefficients determined for each frame or a coefficient with the highest probability is written into the coefficient memory 15.

Next, an error detecting operation using coefficients learnt and determined will be described. As described above, the coefficient memory 15 stores coefficients, which have been learnt and determined, corresponding to classes. The input image data received from the input terminal 11 is supplied to the time sequence converting circuit 12. Output data of the time sequence converting circuit 12 is supplied to a class categorizing circuit 14 and an estimation value generating circuit 16. As shown in FIG. 1, the time sequence converting circuit 12 receives pixel data of raster scanning sequence, combines past pixels and future pixels, and outputs the combined pixels at a time. The class categorizing circuit 14 receives data of four pixels used for the class categorization. The class categorizing circuit 14 supplies an index to the coefficient memory 15. The coefficient memory 15 outputs a set of coefficients corresponding to the class.

The coefficients are supplied to the estimation value generating circuit 16. The estimation value generating circuit 16 generates an estimated value corresponding to pixel data received from the time sequence converting circuit 12. The estimated value is supplied to a subtracting circuit 18. In addition to the estimated data, input image data is supplied to the subtracting circuit 18 through a delaying circuit 17. The subtracting circuit 18 generates a difference value between the real value (real data) and the estimated value. The difference value is supplied to an error determining circuit 19. The error determining circuit 19 outputs an error flag FL2 that represents whether or not an input image has an error. The error flag FL2 is obtained from an output terminal 20.

Figure 3:
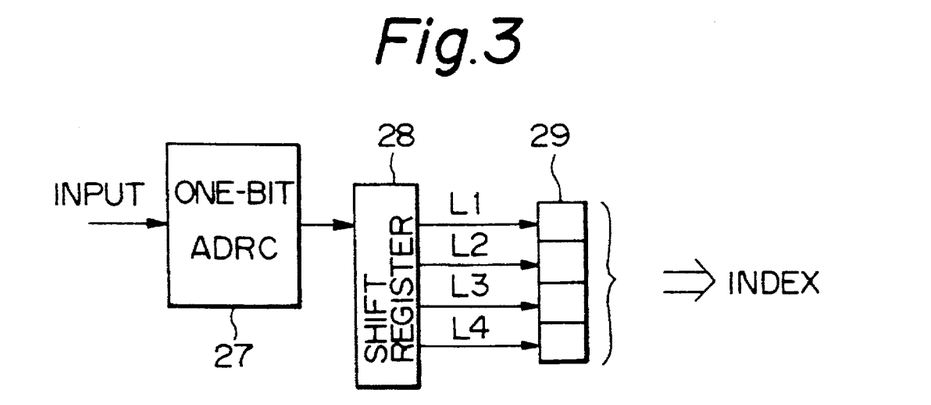
FIG. 3 is a block diagram showing an example of a class categorizing circuit.

In an example shown in FIG. 3, coefficients that have been learnt are used. In addition, by learning normal input image data, coefficients may be successively updated. Moreover, coefficients that have been learnt may be changed corresponding to input image data.

Next, the constructional elements of the embodiment shown in FIG. 2 will be described in detail. FIG. 3 is a schematic diagram showing a class categorizing circuit 4, 14. Input image data (constructed of four pixels) are successively supplied to a one-bit ADRC circuit 27. The ADRC circuit 27 detects the maximum value and the minimum value of the four pixels and outputs a dynamic range DR that is a difference value between the maximum value and the minimum value. A value of each pixel is divided by the dynamic range DR. The quotient is compared with 0.5. When the quotient is equal to or larger than 0.5, code "1" is formed. When the quotient is smaller than 0.5, code "0" is formed.

The ADRC circuit 27 compresses the value of each pixel to data constructed of one bit ("0" or "1"). An output of the ADRC circuit 27 is converted into parallel data by a shift register 28. The shift register 28 outputs four bits L1, L2, L3, and L4 in parallel. The four bits L1, L2, L3, and L4 are stored in a register 29. The four bits L1, L2, L3, and L4 are indexes.

Figure 4:
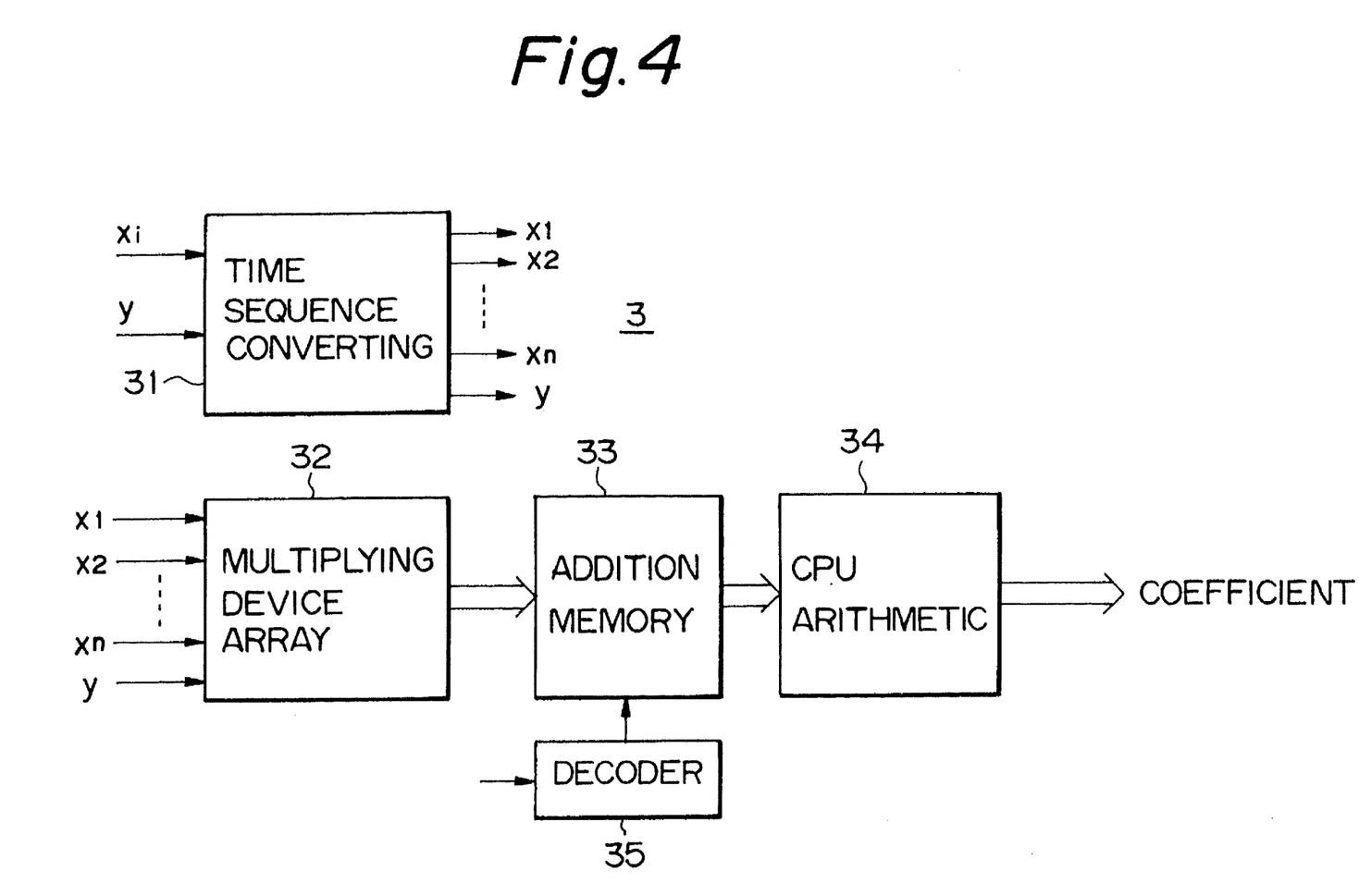
FIG. 4 is a block diagram showing a construction of a least square calculating circuit.

FIG. 4 is a detail block diagram showing a construction of the least square calculating circuit 3. In FIG. 4, an input digital image signal is supplied to a time sequence converting circuit 31. The time sequence converting circuit 31 matches time sequence of real data y of an objective pixel with time sequence of data $x_i$ used for a linear coupling operation. Output data of the time sequence converting circuit 31 is supplied to a multiplying device array 32. The multiplying device array 32 is connected to an addition memory 33. Indexes are supplied to a decoder 35. The decoder 35 outputs class information to the addition memory 33. The multiplying device array 32 and the addition memory 33 construct a normal equation generating circuit.

Figure 5:
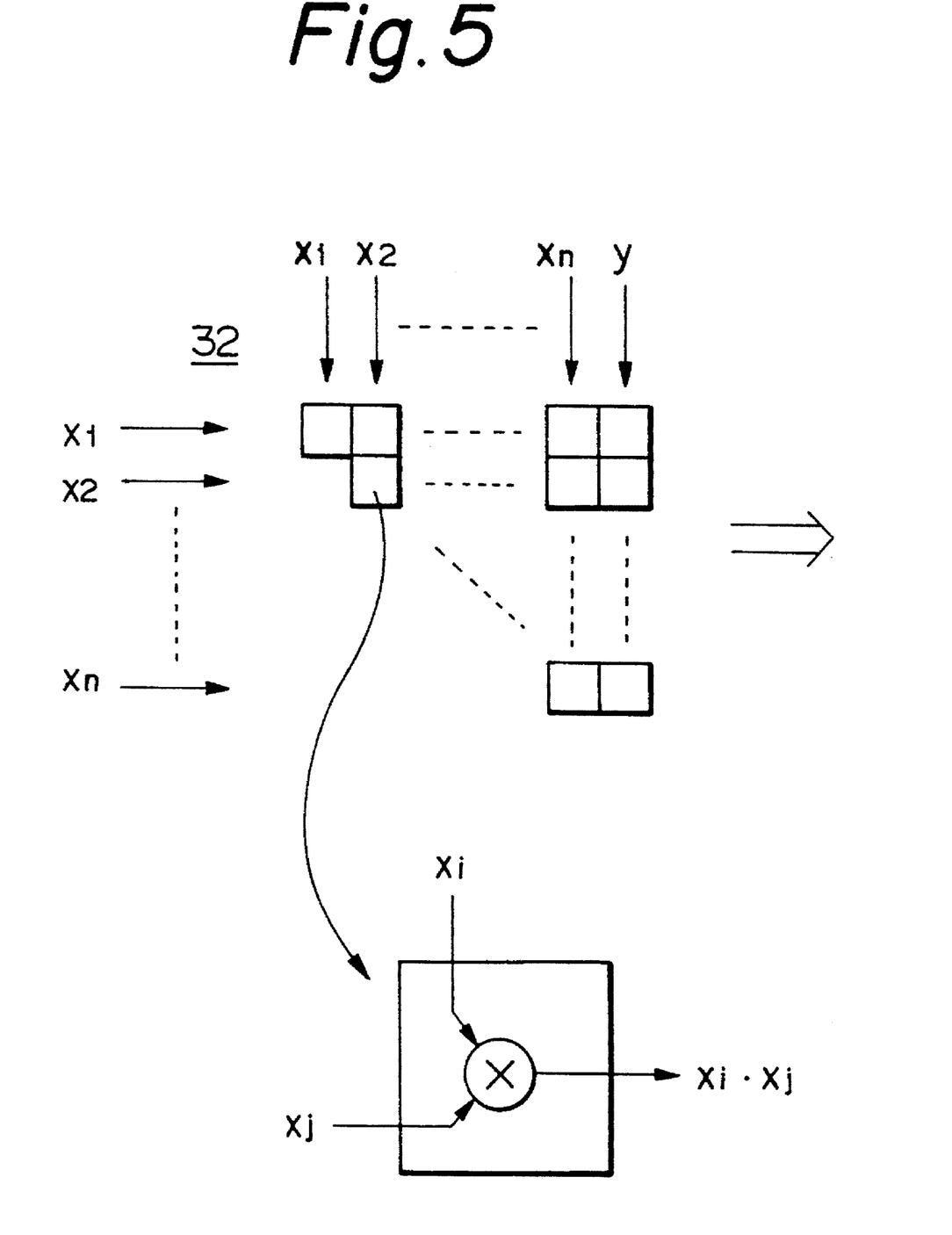
FIG. 5 is a schematic diagram for explaining a multiplying device array included in the least square calculating circuit.

The multiplying device array 32 multiplies each pixel. The addition memory 33 is constructed of an adding device array and a memory array. The multiplying device array 32 outputs multiplied results to the adding device array. FIG. 5 is a schematic diagram showing a practical construction of the multiplying device array 32. In FIG. 5, square cells represent multiplying devices. The multiplying device array 32 multiplies each pixel and supplies the results to the addition memory 33.

Figure 6:
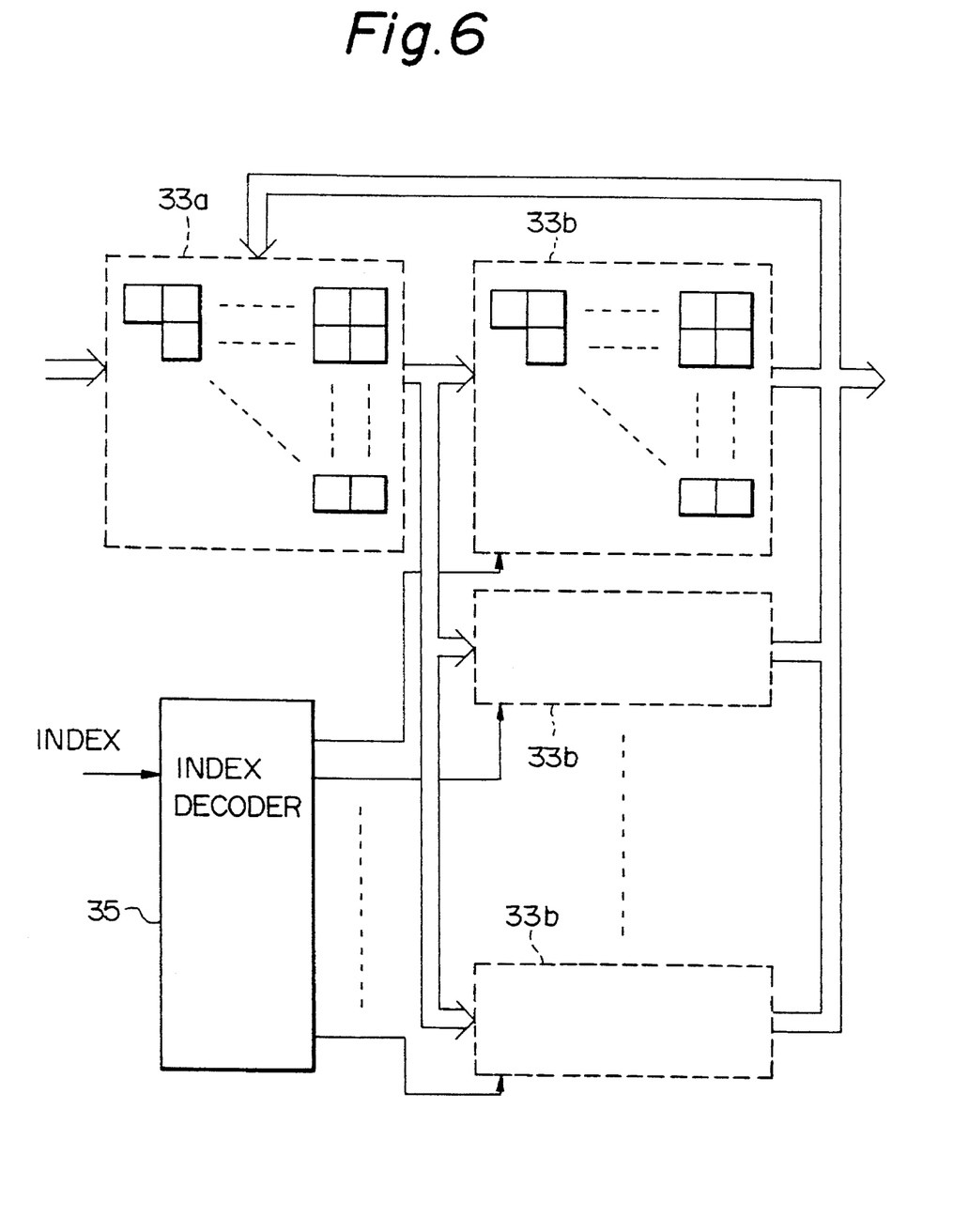
FIG. 6 is a schematic diagram for explaining an adding device array and a memory array included in the least square calculating circuit.

As shown in FIG. 6, the addition memory 33 is constructed of an adding device array 33a and a memory (or register) array 33b. The memory arrays 33b corresponding to classes are connected to respective adding device arrays 33a. One memory array 33b corresponding to the output (class) of the index decoder 35 is selected. The output of the memory array 33b is fed back to the adding device array 33a. The multiplying device array 32, the adding device array 33a, and the memory array 33b incorporatedly perform sum-of-product operation. A memory array is selected corresponding to a class determined by an index. The content of the memory array is updated corresponding to the result of the sum-of-product operation.

With respect to the sum-of-product term of $w_i$ of the above-described normal equation (7), the first element and the second element of an upper right term are equal to the second element and the first element of a lower left term thereof. Thus, by dividing the equation (7) into two triangular portions along a line that connects the upper left corner and the lower right corner and by calculating terms included in the upper triangular portion, the sum-of-product operation can be simplified. As shown in FIGS. 5 and 6, the multiplying device array 32, the adding device array 33a, and the memory array 33b have multiplying cells and memory cells necessary for calculating the terms included in the upper triangular portion.

As an input image is received, the sum-of-product operation is performed, thereby generating a normal equation. The result of each term of the normal equation for each class is stored in a corresponding memory array 33b. Next, as shown in FIG. 4, each term of the normal equation is calculated corresponding to sweepout method by a CPU arithmetic circuit 34. The normal equation (simultaneous equation) is solved by the calculations of the CPU. Thus, coefficients, which are the most suitable values, can be obtained. These coefficients are output.

Figure 7:
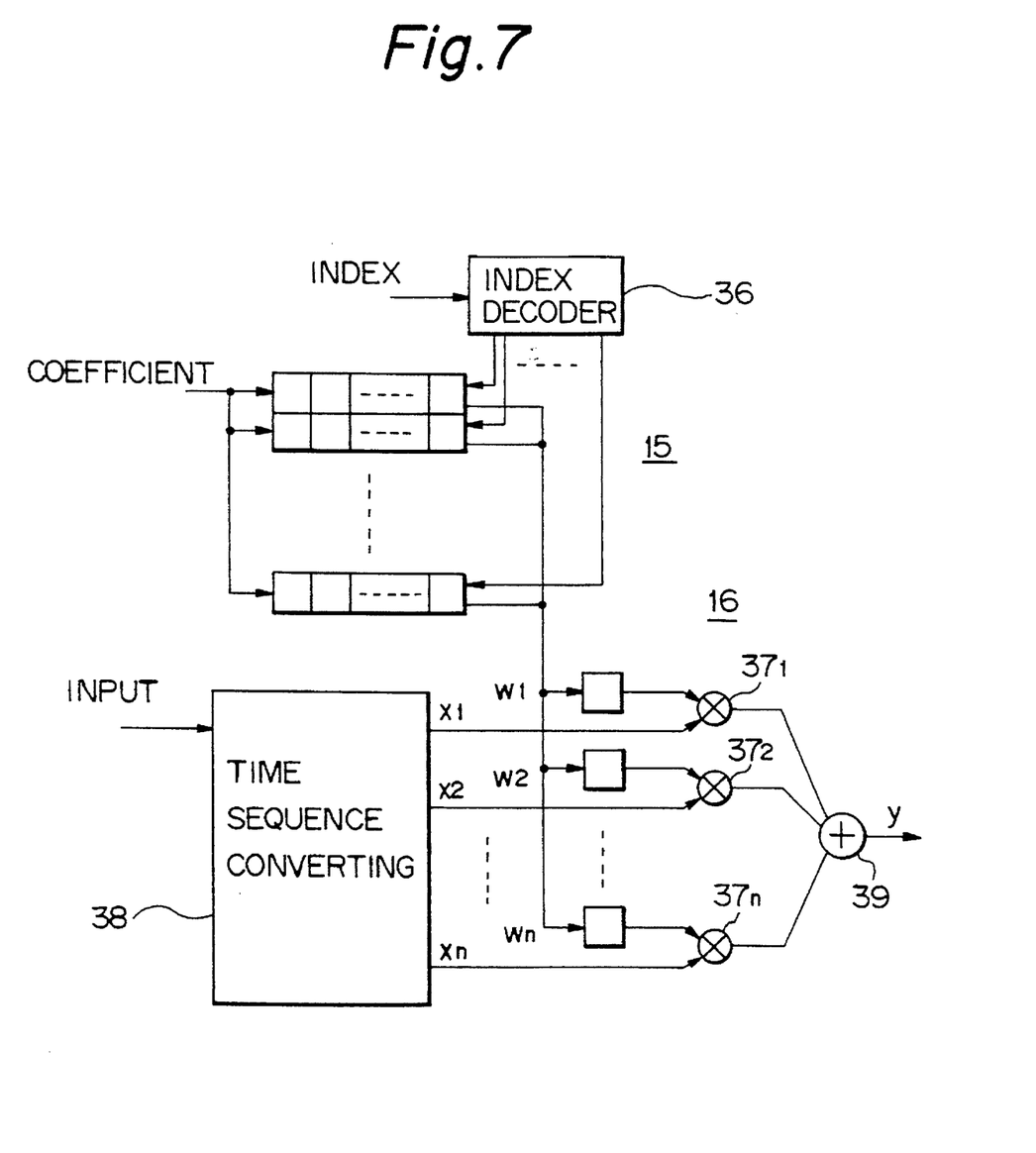
FIG. 7 is a block diagram showing an example of an estimation value generating circuit.

FIG. 7 is a schematic diagram showing constructions of the coefficient memory 15 and the estimation value generating circuit 16. The coefficient memory 15 stores a set of coefficients for each class and outputs a set of coefficients selected corresponding to a class identification signal received from an index decoder 36. A set of coefficients $w_1$ to $w_n$ are supplied to multiplying devices $37_1$ to $37_n$. In addition, pixel data $x_1$ to $x_n$ received from a time sequence converting circuit 38 are supplied to multiplying devices $37_1$ to $37_n$ through buffers, respectively. Outputs of the multiplying devices $37_1$ to $37_n$ are supplied to an adding device 39. The adding circuit 39 outputs an estimated value y $(=x_1w_1+x_2w_2+ \ldots +x_nw_n)$.

Figure 8:
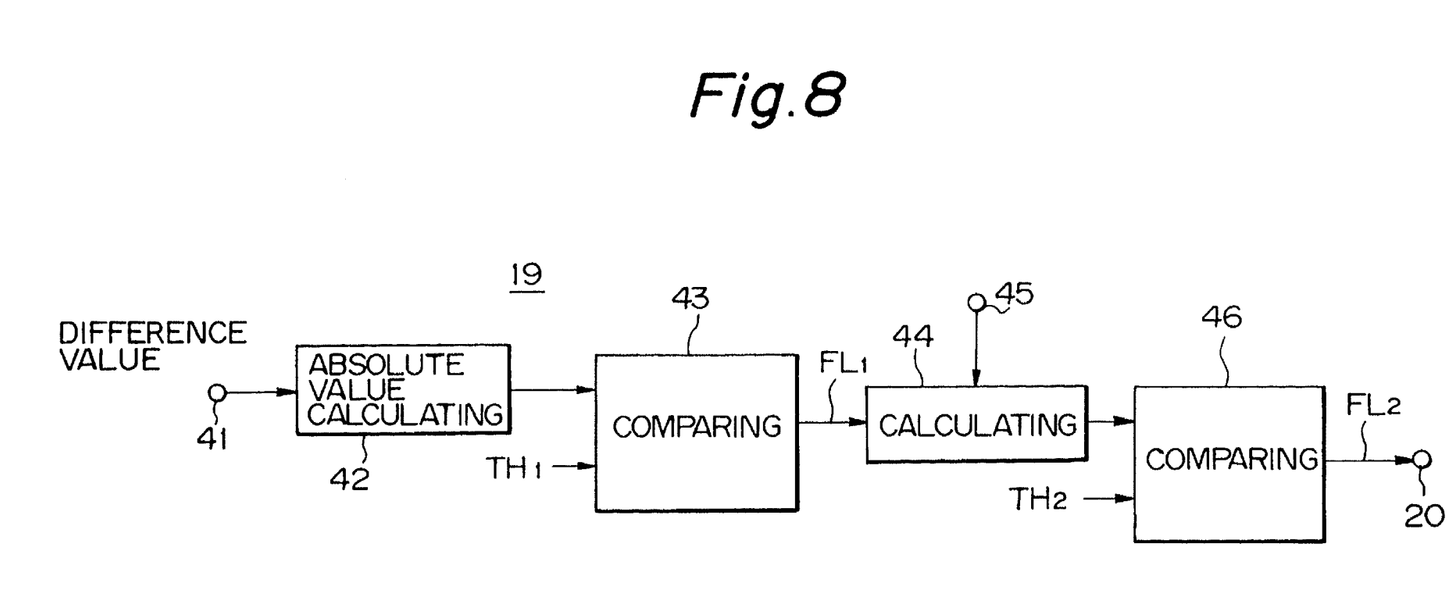
FIG. 8 is a block diagram showing an example of an error determining circuit.

As shown in FIG. 4, the subtracting circuit 18 outputs a difference value between the estimated value y received from the estimation value generating circuit 16 and the true value received from the delaying circuit 17. FIG. 8 is a block diagram showing a construction of the error determining circuit 19, which receives the difference value. The difference value is supplied to an absolute value calculating circuit 42 through an input terminal 41. The absolute value calculating circuit 42 outputs the absolute value of the difference value. The absolute value is supplied to a comparing device 43. The comparing device 43 compares the absolute value with a first threshold value TH1. The comparing device 43 generates a flag FL1. When the absolute value of the difference value is larger than the threshold value TH1, the flag FL1 becomes "1". The flag FL1="1" represents a presumed error.

The flag FL1 is supplied to a counting circuit 44. An enable signal that designates a counting period is supplied to a counting circuit 44 through a terminal 45. For example, a counting period for one frame is designated. In the designated counting period, the number of times that the flag FL1 becomes "1" is counted. The counted value of the counting circuit 44 is supplied to a comparing device 46. The comparing device 46 compares the counted value with a second threshold value TH2. When the counted value is larger than the threshold value TH2, the output of the comparing device 46, namely flag FL2, becomes "1". The flag FL2, which is a last error flag, is output from an output terminal 20.

In the above-described embodiment, input information from such as a monitor camera was an image. However, the present invention is not limited to an image. Instead, the present invention may be applied to sound information or measurable information. For example, the present invention may be applied to waveforms of seismometers, waveforms of electrocardiograms, brain waves, supersonic wave echo, and so forth. These waves are one-dimensional waves. The construction methods of models and classes are one-dimensional.

As is clear from the above description, according to the present invention, classes are pre-categorized corresponding to normal input information. When new input signal is received, it is categorized as a class corresponding to coefficients that have been learnt for each class so as to predict a future signal. When the predicted signal different from the real signal, the predicted signal is treated as a presumed error. After a counting operation is performed for a predetermined period, a second threshold value is determined so as to detect an error. Since the learning operation has been performed, low burst characteristics are provided for input signals in various conditions. In addition, error signals that are apart from the learnt signals can be easily detected. According to the present invention, the detection accuracy can be improved without need to provide a plurality of error patterns.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An error detecting apparatus for detecting an error of an input digital information signal, comprising:

coefficient generating means for inputting a plurality of information data, forming a class corresponding to a pattern of the information data, and outputting a coefficient for the class corresponding to a least square method;

means for inputting the input digital information signal and categorizing the input digital information signal as the class;

estimating means in communication with said coefficient generating means and with said means for inputting the input digital information signal for linear-primary-coupling the coefficient corresponding to the class and the input digital information so as to generate an estimated value of a future data of the input digital information;

means in communication with said estimating means for generating a difference value between a true value of the future data of the input digital information and an estimated value estimated by said estimating means; and determining means in communication with said means for generating a difference value and having a comparing means, the comparing means being adapted for comparing the difference value with a predetermined threshold value so as to determine whether or not the input digital information signal is defective corresponding to the compared result of the comparing means.

2. The error detecting apparatus as set forth in claim 1, wherein said coefficient generating means comprises a memory for inputting a plurality of predetermined information data, pre-calculating a coefficient corresponding to the class, and storing the calculated coefficient for the class.

3. The error detecting means as set forth in claim 1, wherein said determining means comprises means for inputting the compared result of said comparing means and for determining whether or not a number of the difference values that exceed the predetermined threshold value exceeds a predetermined value in a predetermined time period so as to determine whether or not the input digital information signal is defective.

4. An error detecting method for detecting an error of an input digital information signal, comprising the steps of:

receiving a plurality of information data, forming a class corresponding to a pattern of the information data, and outputting a coefficient for the class corresponding to a least square method;

receiving the input digital information signal and categorizing the input digital information signal as the class;

linear-primarily-coupling the coefficient corresponding to the class and the input digital information signal so as to generate an estimated value of future data of the input digital information signal;

generating a difference value between a true value of future data of the input digital information signal and the estimated value; and comparing the difference value with a threshold value so as to determine whether or not the input digital information signal is defective corresponding to the compared result.

5. The method as set forth in claim 4, further comprising the step of:

inputting a plurality of predetermined information data, pre-calculating a coefficient of the class, and storing the calculated coefficient in a memory.

6. The method as set forth in claim 4, further comprising the step of:

inputting the compared result, determining whether or not a number of the difference values that exceed the threshold value in a predetermined time period exceeds a predetermined value so as to determine whether or not the input digital information signal is defective corresponding to the determined result.

* * * * *